United States Patent
Ma et al.

(10) Patent No.: US 10,454,157 B2
(45) Date of Patent: Oct. 22, 2019

(54) HOUSING, METHOD FOR MANUFACTURING HOUSING, AND MOBILE TERMINAL

(71) Applicant: Guangdong Oppo Mobile Telecommunications Corp., Ltd., Dongguan, Guangdong (CN)

(72) Inventors: Jun Ma, Guangdong (CN); Guangming Yang, Guangdong (CN)

(73) Assignee: Guangdong Oppo Mobile Telecommunications Corp., Ltd., Dongguan (CN)

(*) Notice: Subject to any disclaimer, the term of this patent is extended or adjusted under 35 U.S.C. 154(b) by 0 days.

(21) Appl. No.: 16/197,113

(22) Filed: Nov. 20, 2018

(65) Prior Publication Data

US 2019/0089039 A1 Mar. 21, 2019

Related U.S. Application Data (63) Continuation of application No. 15/677,607, filed on Aug. 15, 2017, now Pat. No. 10,361,478.

(30) Foreign Application Priority Data

Aug. 16, 2016 (CN) .......................... 2016 1 0679739

(51) Int. Cl.
*H01Q 1/24* (2006.01)
*H04M 1/02* (2006.01)
*B23B 1/00* (2006.01)

(52) U.S. Cl.
CPC .............. *H01Q 1/243* (2013.01); *B23B 1/00* (2013.01); *H04M 1/0202* (2013.01); *H04M 1/0283* (2013.01)

(58) Field of Classification Search
CPC ........ H04M 1/0249; B32B 7/12; B32B 27/06; B32B 37/12; B32B 38/145; B32B 2309/105; H05K 5/02; H05K 5/04
See application file for complete search history.

(56) References Cited

U.S. PATENT DOCUMENTS 9,564,677 B2 * 2/2017 Tian ...................... H01Q 1/243
9,826,668 B2 * 11/2017 Jang .................... H04M 1/0266
(Continued)

FOREIGN PATENT DOCUMENTS

| CN | 104821438 A | 8/2015 |
| CN | 105517389 A | 4/2016 |

(Continued)

OTHER PUBLICATIONS

Extended European search report issued in corresponding European application No. 17185354.2 dated Jan. 2, 2018.
(Continued)

*Primary Examiner* — Pablo N Tran
(74) *Attorney, Agent, or Firm* — Young Basile Hanlon & MacFarlane, P.C.

(57) ABSTRACT

A housing, a method for manufacturing the housing, and a mobile terminal are provided. The method includes: manufacturing a housing made of shielding material and having a first surface and a second surface opposite to the first surface; defining at least one slot in the housing, wherein the at least one slot has a depth less than a thickness of the housing and has an opening in the first surface and a bottom opposite to the opening; filling the at least one slot with first non-shielding material; and removing at least a portion of the housing which is located between the bottom of the at least one slot and a portion of the second surface opposite to
(Continued)

the bottom of the at least one slot, such that the at least one slot penetrates through the housing in the thickness direction of the housing.

8 Claims, 11 Drawing Sheets

(56) References Cited

U.S. PATENT DOCUMENTS

| | | | |
|---|---|---|---|
| 10,159,156 B2* | 12/2018 | Seo | H05K 5/0004 |
| 10,270,895 B2* | 4/2019 | Bao | H04B 1/3827 |
| 2011/0279002 A1* | 11/2011 | Han | B29C 45/14065 |
| | | | 312/223.1 |
| 2015/0222009 A1 | 8/2015 | Asou et al. | |
| 2016/0072932 A1 | 3/2016 | Hill et al. | |
| 2016/0191681 A1 | 6/2016 | Han et al. | |
| 2016/0255184 A1* | 9/2016 | Hwang | H04B 5/0031 |
| | | | 455/41.1 |
| 2016/0357223 A1* | 12/2016 | Kim | G06F 1/1613 |
| 2017/0079150 A1* | 3/2017 | Do | H05K 5/02 |
| 2018/0343332 A1* | 11/2018 | Kim | H04M 1/0249 |
| 2019/0152186 A1* | 5/2019 | Shimoda | B32B 15/08 |

FOREIGN PATENT DOCUMENTS

| | | |
|---|---|---|
| CN | 105530786 A | 4/2016 |
| CN | 105657101 A | 6/2016 |
| CN | 105773905 A | 7/2016 |
| CN | 105813422 A | 7/2016 |
| CN | 105846054 A | 8/2016 |
| CN | 105847495 A | 8/2016 |
| CN | 205430838 U | 8/2016 |
| CN | 106028724 A | 10/2016 |
| EP | 2781987 A1 | 9/2014 |
| WO | 2011076582 A1 | 6/2011 |

OTHER PUBLICATIONS

International search report issued in corresponding International application No. PCT/CN2017/097456 dated Oct. 27, 2017.
Examination report issued in corresponding European Application No. 17185354.2 dated May 20, 2019.

* cited by examiner

HOUSING, METHOD FOR MANUFACTURING HOUSING, AND MOBILE TERMINAL

CROSS-REFERENCE TO RELATED APPLICATION(S)

This application is a continuation of U.S. application Ser. No. 15/677,607, filed on Aug. 15, 2017, which claims priority to Chinese Patent Application No. 201610679739.9, filed on Aug. 16, 2016, the content of both of which are hereby incorporated by reference in their entireties.

TECHNICAL FIELD

The present disclosure relates to electronic devices, and more particularly, to a housing, a method for manufacturing the housing, and a mobile terminal.

BACKGROUND

With development of science and technology as well as market demand, a mobile phone having a metal housing is becoming more and more popular. The mobile phone having the metal housing has a beautiful appearance, but the metal housing may block radio signals from an antenna to some extent.

Currently, a gap area is defined in the metal housing by computer numerical control (CNC) machining, so as to enable transmission of the radio signals. Generally, a slot is defined in the metal housing by CNC machining, and then plastic is injected into the slot. However, the injecting pressure may be too great when injecting the plastic, such that the slot is pressed, deformed, and thus has a non-uniform width, which destroying appearance unity of the housing.

BRIEF DESCRIPTION OF THE DRAWINGS

In order to more clearly describe technical solutions according to implementations of the present disclosure, accompanying drawings used in the implementations will be briefly introduced hereinafter. Apparently, the accompanying drawings described hereinafter show some implementations of the present disclosure, and persons skilled in the art may also derive other drawings from these accompanying drawings without creative efforts.

DETAILED DESCRIPTION

A clear, complete description for the technical solutions of implementations of the present disclosure is provided below, in conjunction with the drawings in the implementations of the present disclosure. Apparently, the implementations to be described are a part, rather than all of implementations of the present disclosure. Other implementations obtained by persons skilled in the art from the implementations given herein without creative efforts should all fall within the protection scope of the present disclosure.

According to one aspect of the present disclosure, a method for manufacturing a housing is provided.

Figure 1:
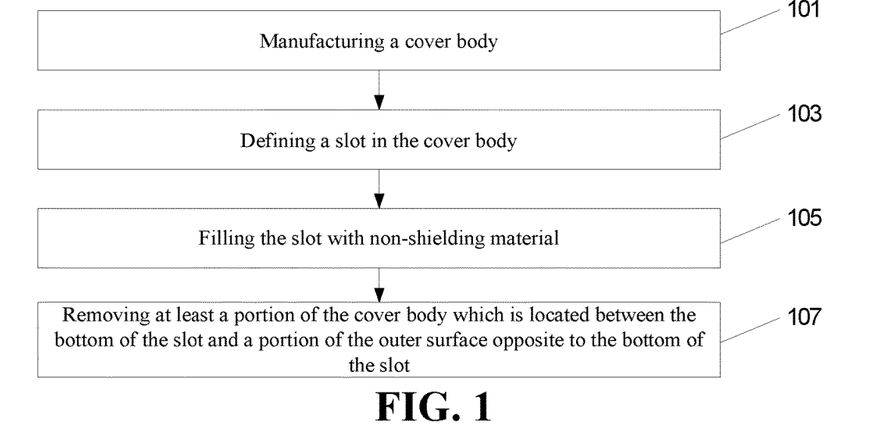
FIG. 1 is a flowchart of a method for manufacturing a housing according to an implementation of the present disclosure.

FIG. 1 illustrates a flowchart of a method for manufacturing a housing according to an implementation of the present disclosure. The housing may serve as a back cover of a mobile terminal. As illustrated in FIG. 1, the method according to the implementation of the present disclosure may begin at block 101.

At block 101: a housing is manufactured. The housing is made of shielding material.

In one implementation of the present disclosure, the housing may be made according to actual requirements. The housing includes a back plate and four side walls surrounding the back plate. Two of the four side walls are a pair of oppositely disposed long side walls and face to each other, while the other two are a pair of oppositely disposed short side walls and face to each other. The four side walls are mainly used for being connected to a front cover of the mobile terminal. The housing has a first surface facing the interior of the mobile terminal and a second surface disposed oppositely to the first surface. The second surface is exposed outside and can be directly touched by a user. For convenient description, the first surface is referred to as an inner surface, while the second surface is referred to as an outer surface. Naturally, in other implementations, the housing may include a back plate with snaps disposed on the periphery of the back plate, such that the back plate can be connected to the front cover of the mobile terminal by a snap-fit.

It will be appreciated that material forming the housing may be metal. In one implementation of the present disclosure, the material of the housing is aluminum or aluminum alloy which facilitates shaping the housing.

Figure 2:
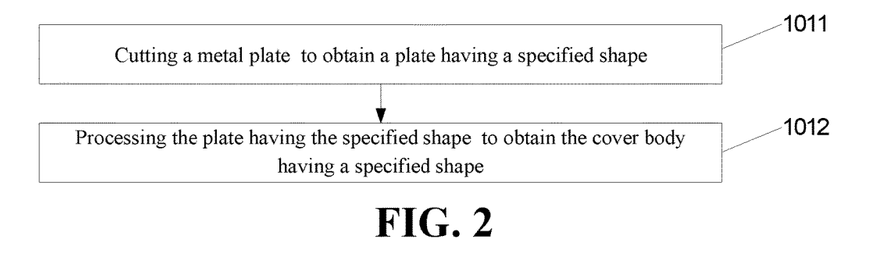
FIG. 2 is a flowchart of manufacturing a housing.

FIG. 2 is a flowchart of manufacturing the housing. As illustrated in FIG. 2, the flowchart of manufacturing the housing may begin at block 1011.

At block 1011: a metal plate is cut to obtain a plate having a specified shape. Namely, a to be processed plate having the specified shape is obtained by cutting the metal plate.

In one implementation of the present disclosure, a large plate made of aluminum is cut by a cutting tool, so as to obtain the plate having the specified shape.

At block 1012: the plate having the specified shape is processed to obtain the housing having a specified shape. In one implementation, the housing having the specified shape is obtained by processing inner structure and outer shape of the to be processed plate.

In one implementation of the present disclosure, the plate having the specified shape is processed with a CNC lathe, so as to obtain the housing having the specified shape.

In one implementation of the present disclosure, the plate having the specified shape is placed into a mold, and is pressed. It will be appreciated that the plate having the specified shape may be pressed once or many times. Then the plate having the specified shape is processed with the CNC lathe, so as to obtain the housing having the specified shape.

As illustrated in FIG. 1, at block 103: at least one antenna slot (hereinafter: the slot) is defined in the housing.

In one implementation of the present disclosure, the slot is defined in the housing by cutting the inner surface of the housing along a predetermined route. Namely, the slot is processed by cutting the inner surface of the housing along the predetermined route. The slot has a depth less than the whole thickness of the housing, and thus does not penetrate through the housing. That is to say, the slot has an opening in the inner surface and a bottom opposite to the opening. The opening of the slot is at the inner surface and is used for receiving non-shielding material subsequently, while the bottom renders the slot robust, such that the slot is not readily deformed during subsequent filling to ensure the appearance unity of the housing.

It will be appreciated that the predetermined route corresponds to the desired shape of the slot. For example, if the slot is straight, the corresponding predetermined route is also straight; if the slot is curved, the corresponding predetermined route is also curved. It will also be appreciated that the slot in this implementation has a rectangular cross-section.

It will be appreciated that the predetermined route extends from one side wall to another opposite side wall via the back plate, i.e. the slot is located in the two opposite side walls and the back plate. In one implementation of the present disclosure, the slot is defined in the two long side walls and the back plate. Naturally, in other implementations, the predetermined route extends from one side of the back plate to the other side of the back plate, i.e. the slot is merely defined in the back plate and does not extend to the side walls located on the sides of the back plate.

It will be appreciated that the number of the slots is not limited, and may be one or more. Correspondingly, the number of the predetermined routes is also the same as the number of the slots. In one implementation, the number of the slots is three, and the three slots are arranged along the longitudinal direction of the housing at intervals, and the distances between two adjacent slots are the same, i.e., the three slots are arranged in the housing with uniform gaps therebetween.

Figure 3:
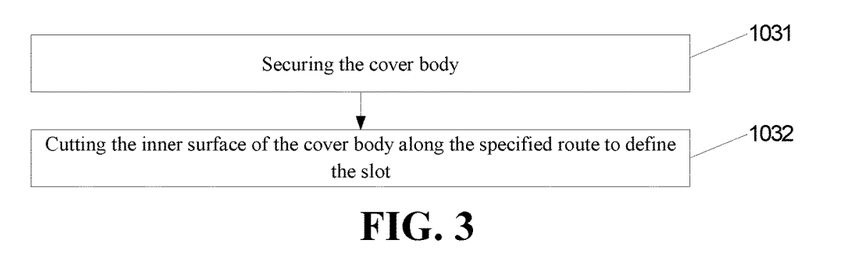
FIG. 3 is a flowchart of defining a slot in the housing.

FIG. 3 is a flowchart of defining the slot in the housing. As illustrated in FIG. 3, the flowchart of defining the slot in the housing may begin at block 1031.

At block 1031: the housing is secured.

At block 1032: the inner surface of the housing is cut along the predetermined route to define the slot.

In one implementation of the present disclosure, the housing is secured to the CNC lathe by means of screwing or pressing by a cylinder. In one implementation of the present disclosure, the housing is vertical when it is secured to the CNC lathe, that is to say, the back plate of the housing is perpendicular to the platform of the CNC lathe. Since the slot is located in the two opposite side walls and the back plate of the housing, the inner surface of the housing is cut from one side wall to the other opposite side wall via the back plate by a T-shaped tool, such as a T-shaped cutter. The T-shaped tool is used to ensure that the slot is defined without stopping, thereby reducing machining time. Naturally, in other implementations, the inner surface of the housing is cut three times by a common tool, so as to define the slot. At first, one side wall is cut to define a portion of the slot located therein, then the back plate is cut to define another portion of the slot located therein, and finally another opposite side wall is cut to define the remaining portion of the slot located therein.

It will be appreciated that the slot has a width tolerance ranged from −0.3 mm to 0.3 mm, which facilitates radiation of radio frequency signals from an antenna.

As illustrated in FIG. 1, at block 105: the slot is filled with non-shielding material.

In one implementation of the present disclosure, the non-shielding material may be the material allowing the radio frequency signals from the antenna to pass therethrough.

Figure 4:
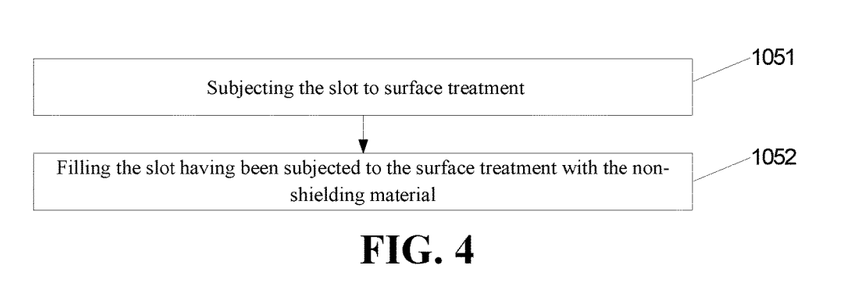
FIG. 4 is a flowchart of filling the slot with non-shielding material.

FIG. 4 is a flowchart of filling the slot with the non-shielding material. As illustrated in FIG. 4, the flowchart of filling the slot with the non-shielding material may begin at block 1051.

At block 1051: the slot is subjected to surface treatment.

At block 1052: the slot having been subjected to the surface treatment is filled with the non-shielding material.

In one implementation of the present disclosure, when the housing is made of aluminum or aluminum alloy, the slot in the housing may be subjected to a T-process, such that the inner side, including the bottom, of the slot can be readily combined with the non-shielding material subsequently. In this case, the non-shielding material may be plastic and the slot is then filled by injecting the plastic. Naturally, in other implementations, the non-shielding material may be gel and the slot is filled with gel by a dispenser. Naturally, in some implementations, the non-shielding material may be a mixture of the plastic and the gel.

As illustrated in FIG. 1, at block 107: at least a portion of the housing which is located between the bottom of the slot and a portion of the outer surface opposite to the bottom of the slot is removed. Namely, the material with a predetermined thickness of the portion, of the outer surface of the housing, corresponding to the at least one antenna slot is removed, such that the slot penetrates through the housing.

Since the slot does not penetrate through the housing at this time, the bottom of the slot is still metallic and disadvantageous to the radio frequency signals from the antenna passing through the housing. Hence, the housing is cut by a predetermined thickness starting from the second surface. The predetermined thickness is less than the whole thickness of the housing, but the sum of the depth of the slot and the predetermined thickness is greater than or equal to the whole thickness of the housing such that the slot penetrates through the housing in the thickness direction of the housing, and only the non-shielding material is received in the slot, which facilitates the radio frequency signals from the antenna passing therethrough.

It will be appreciated that, the housing may be cut by the predetermined thickness starting from the second surface by means of milling, such that the slot penetrates through the housing. In one implementation of the present disclosure, the bottom of the slot is closer to the outer surface of the housing, and the housing is cut by the predetermined thickness starting from the second surface by means of milling until the bottom of the slot becomes another opening, i.e., the slot penetrates through the housing. Naturally, in other implementations, the housing may be cut by the predetermined thickness by means of laser engraving such that the slot penetrates through the housing.

Naturally, in other implementations, only a portion of the outer surface opposite to the slot may be cut, and a cutting depth is no less than the predetermined thickness. Furthermore, in order to ensure the flatness of the outer surface, the slot may be filled with another non-shielding material from the outer surface side. This non-shielding material may be the same as the foregoing non-shielding material.

In the method for manufacturing the housing according to the present disclosure, the slot having the depth less than the thickness of the housing is defined by cutting the inner surface of the housing along a predetermined route. Therefore, the slot does not penetrate through the housing, and the thickness between the bottom of the slot and the outer surface of the housing renders the slot robust, such that the slot is not readily deformed due to great pressure when the slot is filled with non-shielding material, thereby improving the appearance unity of the housing.

According to another aspect of the present disclosure, another method for manufacturing a housing is provided.

Figure 5:
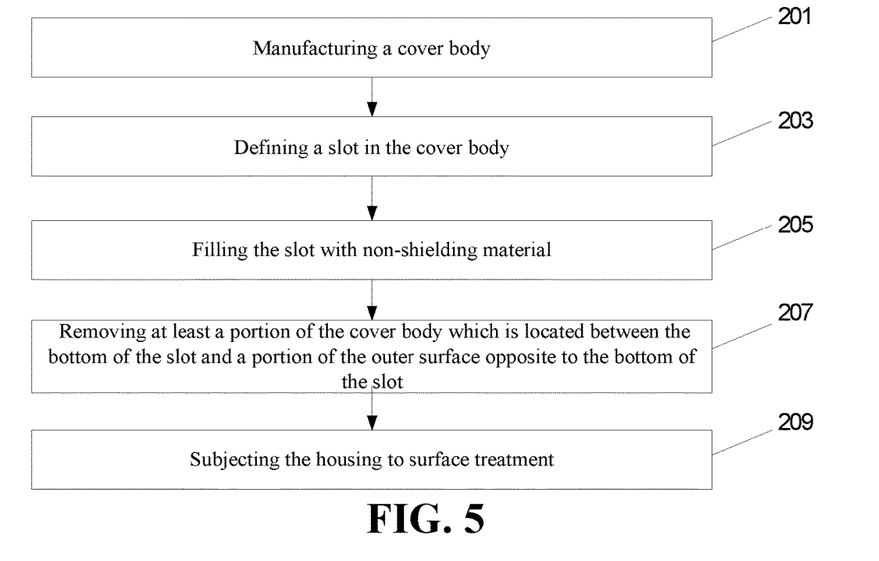
FIG. 5 is a flowchart of another method for manufacturing a housing according to an implementation of the present disclosure.

FIG. 5 illustrates a flowchart of another method for manufacturing a housing according to an implementation of the present disclosure. The housing may serve as a back cover of a mobile terminal. As illustrated in FIG. 5, the method according to the implementation of the present disclosure may begin at block 201.

At block 201: a housing is manufactured. The housing is made of shielding material.

In one implementation of the present disclosure, the housing may be made according to actual requirements. The housing includes a back plate and four side walls surrounding the back plate. Two of the four side walls are a pair of oppositely disposed long side walls, while the other two are a pair of oppositely disposed short side walls. The four side walls are mainly used for being connected to a front cover of the mobile terminal. The housing has a first surface facing the interior of the mobile terminal and a second surface disposed oppositely to the first surface. The second surface is exposed outside and can be directly touched by a user. For convenient description, the first surface is referred to as an inner surface, while the second surface is referred to as an outer surface. Naturally, in other implementations, the housing may include a back plate with snaps disposed on the periphery of the back plate, such that the back plate can be connected to the front cover of the mobile terminal by a snap-fit.

It will be appreciated that material forming the housing may be metal. In one implementation of the present disclosure, the material of the housing is aluminum or aluminum alloy which facilitates shaping the housing.

Figure 6:
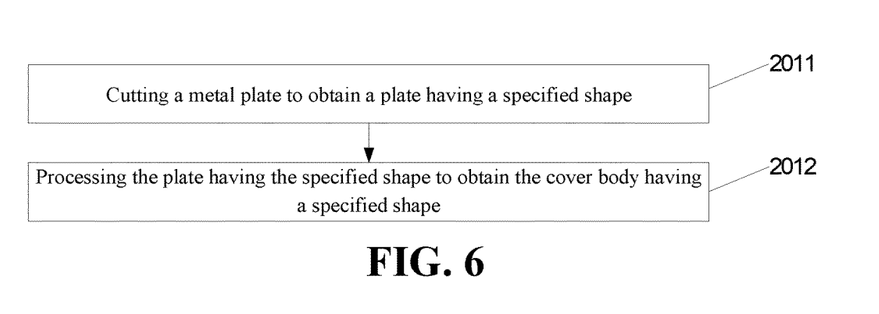
FIG. 6 is a flowchart of manufacturing a housing.

FIG. 6 is a flowchart of manufacturing the housing. As illustrated in FIG. 6, the flowchart of manufacturing the housing may begin at block 2011.

At block 2011: a metal plate is cut to obtain a plate having a specified shape. Namely, a to be processed plate having the specified shape is obtained by cutting the metal plate.

In one implementation of the present disclosure, a large plate made of aluminum is cut by a cutting tool, so as to obtain the plate having the specified shape.

At block 2012: the plate having the specified shape is processed to obtain the housing having a specified shape.

In one implementation of the present disclosure, the plate having the specified shape is processed with a CNC lathe, so as to obtain the housing having the specified shape.

In one implementation of the present disclosure, the plate having the specified shape is placed into a mold, and is pressed. It will be appreciated that the plate having the specified shape may be pressed once or many times. Then the plate having the specified shape is processed with the CNC lathe, so as to obtain the housing having the specified shape.

As illustrated in FIG. 5, at block 203: a slot is defined in the housing.

In one implementation of the present disclosure, the slot is defined in the housing by cutting the inner surface of the housing along a predetermined route. The slot has a depth less than the whole thickness of the housing, and thus does not penetrates through the housing. That is to say, the slot has an opening in the inner surface and a bottom opposite to the opening. The opening of the slot is at the inner surface and is used for receiving non-shielding material subsequently, while the bottom renders the slot robust, such that the slot is not readily deformed during subsequent filling to ensure the appearance unity of the housing.

It will be appreciated that the predetermined route corresponds to the desired shape of the slot. For example, if the slot is straight, the corresponding predetermined route is also straight; if the slot is curved, the corresponding predetermined route is also curved. It will also be appreciated that the slot in this implementation has a rectangular cross-section.

It will be appreciated that the predetermined route extends from one side wall to another opposite side wall via the back plate, i.e. the slot is located in the two opposite side walls and the back plate. In one implementation of the present disclosure, the slot is defined in the two long side walls and the back plate. Naturally, in other implementations, the predetermined route extends from one side of the back plate to the other side of the back plate, i.e. the slot is merely defined in the back plate and does not extend to the side walls located on the sides of the back plate.

It will be appreciated that the number of the slots is not limited, and may be one or more. Correspondingly, the number of the predetermined routes is also the same as the number of the slots. In one implementation, the number of the slots is three, and the three slots are arranged along the longitudinal direction of the housing, and the distances between two adjacent slots are the same, i.e., the three slots are arranged in the housing with uniform gaps therebetween.

Figure 7:
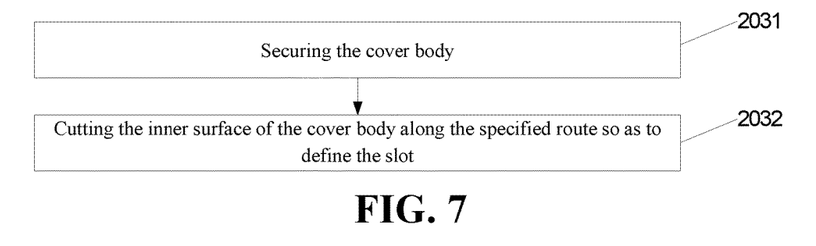
FIG. 7 is a flowchart of defining a slot in the housing.

FIG. 7 is a flowchart of defining the slot in the housing. As illustrated in FIG. 7, the flowchart of defining the slot in the housing may begin at block 2031.

At block 2031: the housing is secured.

At block 2032: the inner surface of the housing is cut along the predetermined route so as to define the slot.

In one implementation of the present disclosure, the housing is secured to the CNC lathe by means of screwing or pressing by a cylinder. In one implementation of the present disclosure, the housing is vertical when it is secured to the CNC lathe, that is to say, the back plate of the housing is perpendicular to the platform of the CNC lathe. Since the slot is located in the two opposite side walls and the back plate of the housing, the inner surface of the housing is cut from one side wall to the other opposite side wall via the back plate by a T-shaped tool. The T-shaped tool is used to ensure that the slot is defined without stopping, thereby reducing machining time. Naturally, in other implementations, the inner surface of the housing is cut three times by a common tool, so as to define the slot. At first, one side wall is cut to define a portion of the slot located therein, then the back plate is cut to define another portion of the slot located therein, and finally another opposite side wall is cut to define the remaining portion of the slot located therein.

It will be appreciated that the slot has a width tolerance ranged from −0.3 mm to 0.3 mm, which facilitates radiation of radio frequency signals from an antenna.

As illustrated in FIG. 5, at block 205: the slot is filled with non-shielding material.

In one implementation of the present disclosure, the non-shielding material may be the material allowing the radio frequency signals from the antenna to pass therethrough.

Figure 8:
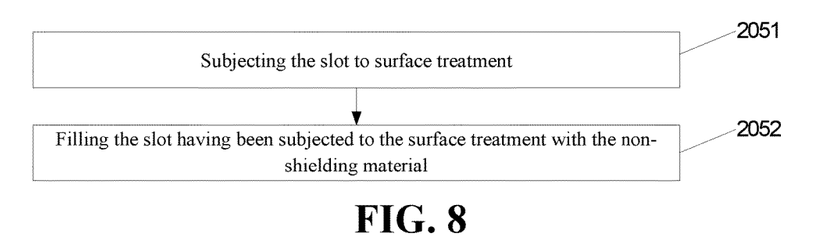
FIG. 8 is a flowchart of filling the slot with non-shielding material.

FIG. 8 is a flowchart of filling the slot with the non-shielding material. As illustrated in FIG. 8, the flowchart of filling the slot with the non-shielding material may begin at block 2051.

At block 2051: the slot is subjected to surface treatment.

At block 2052: the slot having been subjected to the surface treatment is filled with the non-shielding material.

In one implementation of the present disclosure, when the housing is made of aluminum or aluminum alloy, the slot in the housing may be subjected to a T-process, such that the inner side, including the bottom, of the slot can be readily combined with the non-shielding material subsequently. In this case, the non-shielding material may be plastic and the slot is then filled by injecting the plastic. Naturally, in other implementations, the non-shielding material may be gel and the slot is filled with gel by a dispenser. Naturally, in some implementations, the non-shielding material may be a mixture of the plastic and the gel.

As illustrated in FIG. 1, at block 207: at least a portion of the housing which is located between the bottom of the slot and a portion of the outer surface opposite to the bottom of the slot is removed.

Since the slot does not penetrate through the housing at this time, the bottom of the slot is still metallic and disadvantageous to the radio frequency signals from the antenna passing through the housing. Hence, the housing is cut by a predetermined thickness starting from the second surface. The predetermined thickness is less than the whole thickness of the housing, but the sum of the depth of the slot and the predetermined thickness is greater than or equal to the whole thickness of the housing such that the slot penetrates through the housing in the thickness direction of the housing, and only the non-shielding material is received in the slot, which facilitates the radio frequency signals from the antenna passing therethrough.

It will be appreciated that, the housing may be cut by the predetermined thickness starting from the second surface by means of milling, such that the slot penetrates through the housing. In one implementation of the present disclosure, the bottom of the slot is closer to the outer surface of the housing, and the housing is cut by the predetermined thickness starting from the second surface by means of milling until the bottom of the slot becomes another opening, i.e., the slot penetrates through the housing. Naturally, in other implementations, the housing may be cut by the predetermined thickness by means of laser engraving such that the slot penetrates through the housing.

Naturally, in other implementations, only a portion of the outer surface opposite to the slot may be cut, and a cutting depth is no less than the predetermined thickness. Furthermore, in order to ensure the flatness of the outer surface, the slot may be filled with another non-shielding material from the outer surface side. This non-shielding material may be the same as the foregoing non-shielding material.

As illustrated in FIG. 5, at block 209: the housing is subjected to surface treatment. Namely, a surface treatment is executed for the housing.

In one implementation of the present disclosure, the housing is subjected to the surface treatment to further improve the appearance unity of the housing. The surface treatment may include at least one selected from a group consisting of polishing treatment, sandblasting treatment, and oxidizing treatment.

In the method for manufacturing the housing according to the present disclosure, the slot having the depth less than the thickness of the housing is defined by cutting the inner surface of the housing along a predetermined route. Therefore, the slot does not penetrate through the housing, and the thickness between the bottom of the slot and the outer surface of the housing renders the slot robust, such that the slot is not readily deformed due to great pressure when the slot is filled with non-shielding material, thereby improving the appearance unity of the housing.

In the method for manufacturing the housing according to the present disclosure, the housing is further subjected to the surface treatment, thereby further improving the appearance unity of the housing.

According to yet another aspect of the present disclosure, a mobile terminal having a housing is provided.

Figure 9:
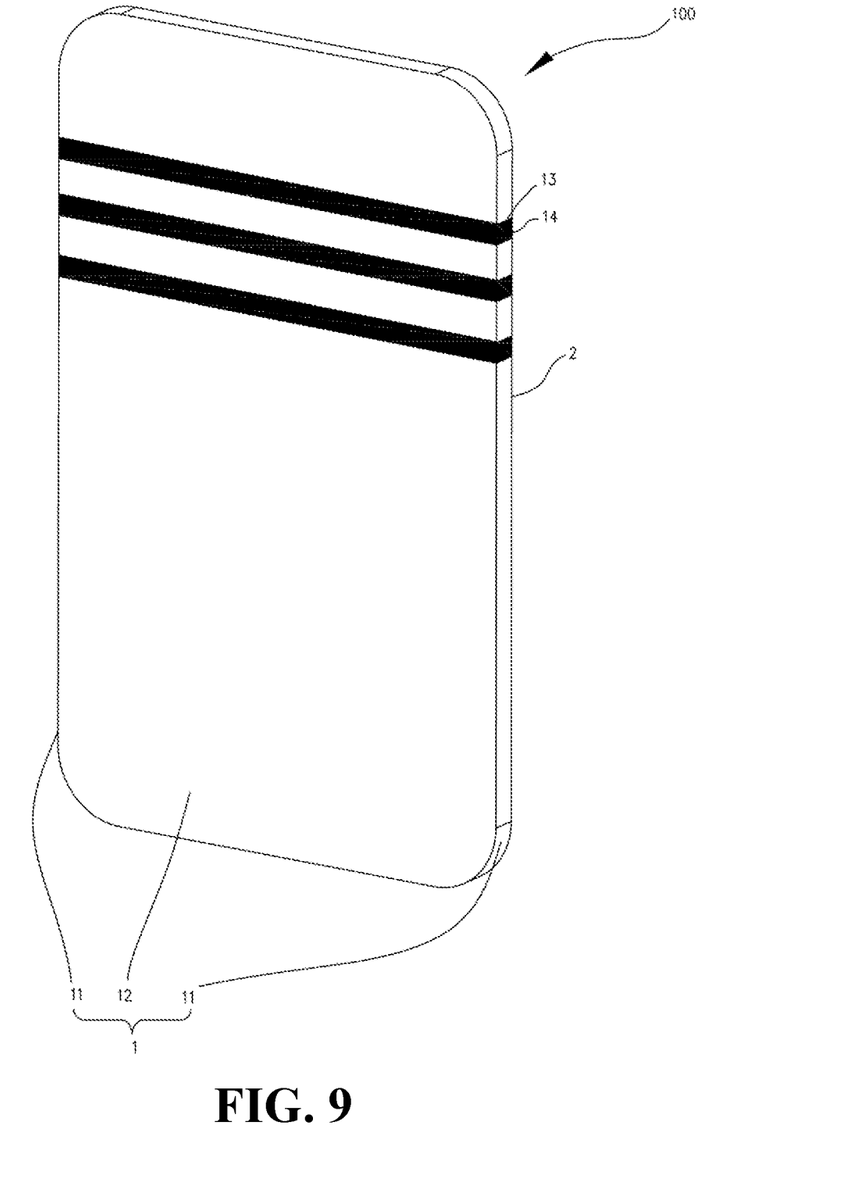
FIG. 9 is a schematic diagram of a mobile terminal according to an implementation of the present disclosure.

FIG. 9 is a schematic diagram of a mobile terminal according to an implementation of the present disclosure. The mobile terminal includes a housing. It should be noted that the housing as illustrated may be manufactured according to the methods in the implementations as illustrated in FIGS. 1 to 8 of the present disclosure. For convenient description, only parts related to the implementation of the present disclosure are illustrated, and details not disclosed will be known from the implementations as illustrated in FIGS. 1 to 8 of the present disclosure.

Referring to FIG. 9, a mobile terminal 100 includes a housing 1 manufactured according to the methods in the implementations as illustrated in FIGS. 1 to 8 and a front cover 2. The mobile terminal 100 according to the implementation of the present disclosure can be any device having communication function and storage function, such as a tablet, a mobile phone, an electronic reader, a remote controller, a personal computer (PC), a notebook computer, an on-board device, a network TV, a wearable device, and so forth. It will be appreciated that the front cover 2 is used for disposing a touch screen and the housing 1 is a back cover of the mobile terminal 100 having an antenna. The housing 1 is connected with the front cover 2 so as to form a shell of the mobile terminal 100.

In the implementation, the housing 1 includes a housing made of shielding material and at least one slot 13 penetrating through the housing in the thickness direction of the housing.

The housing includes a back plate 12 and four side walls 11 surrounding the back plate 12. The four side walls 11 are mainly used for being connected to the front cover 2 of the mobile terminal 100.

The at least one slot 13 is aligned with the antenna, and is filled with non-shielding material 14 and arranged with uniform gaps therebetween.

It will be appreciated that material forming the housing 1 may be metal. In one implementation of the present disclosure, the material of the housing is aluminum or aluminum alloy which facilitates shaping the housing.

Figure 10:
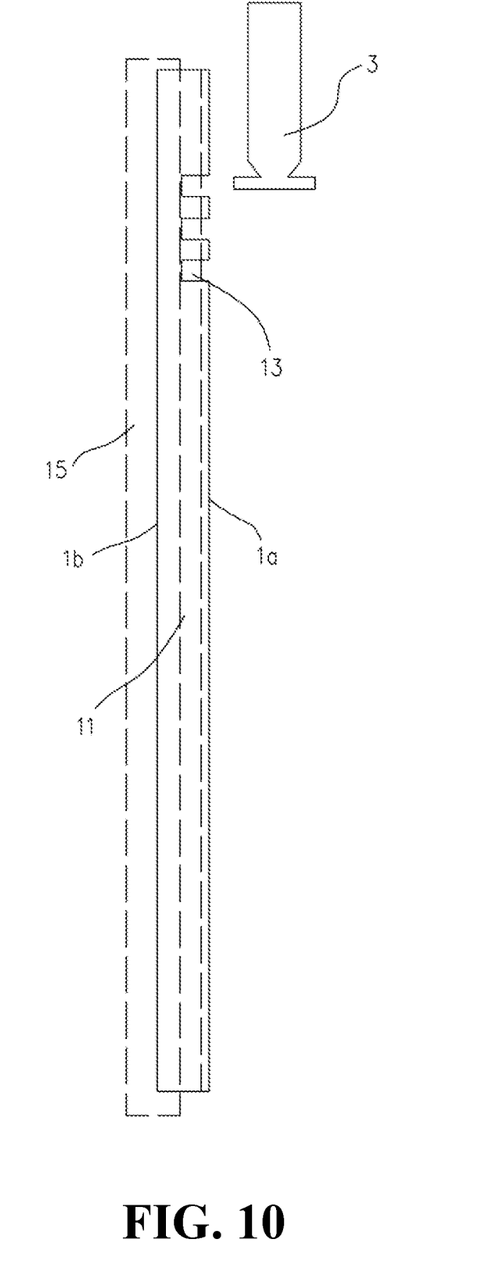
FIG. 10 is a schematic diagram of a housing having a slot not penetrating therethrough.
Figure 11:
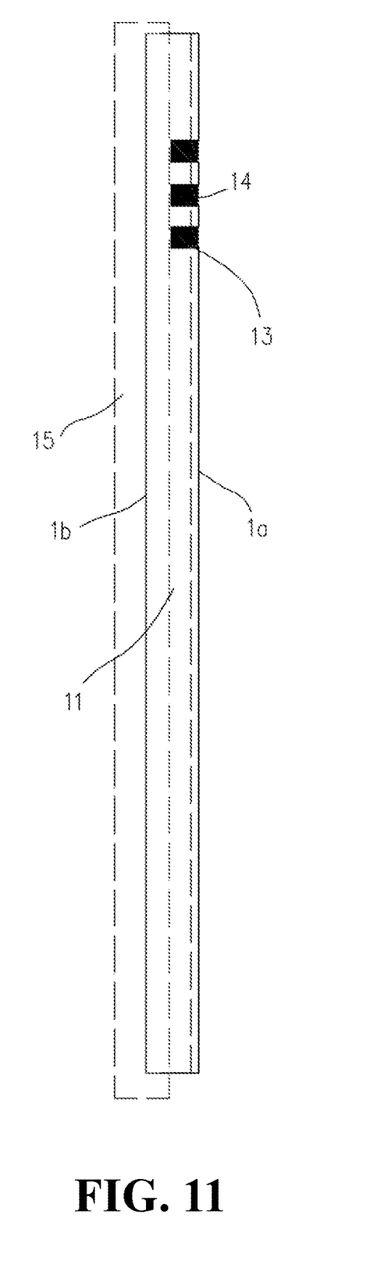
FIG. 11 is a schematic diagram of the housing having the slot filled with non-shielding material.

In one implementation of the present disclosure, the slot 13 penetrates through the housing, and is filled with the non-shielding material 14. The non-shielding material 14 may be plastic or gel. The methods for manufacturing the slot 13 may be known from FIGS. 1 to 8. In one implementation, as illustrated in FIG. 10, the slot 13 is defined by cutting an inner surface 1a of the housing along a predetermined route by a T-shaped tool 3, and at this time, the slot 13 does not penetrate through the housing. Then, as illustrated in FIG. 11, the slot 13 is filled with the non-shielding material 14.

Figure 12:
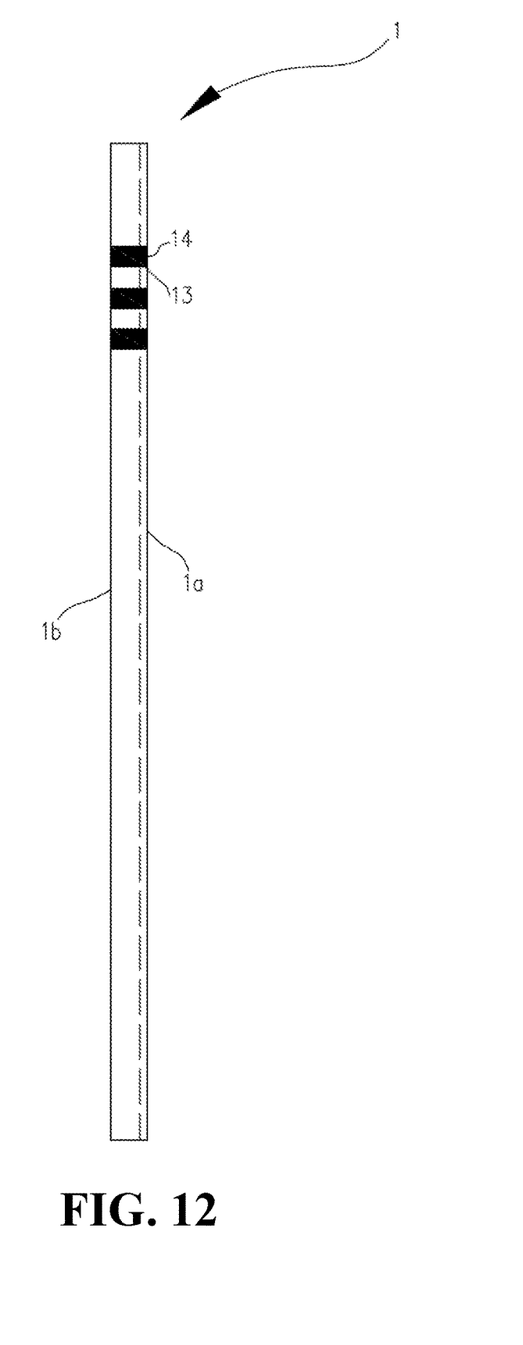
FIG. 12 is a schematic diagram of the housing having a decreased thickness.

In one implementation, the housing is cut by a predetermined thickness 15 starting from an outer surface 1b, and at this time, as illustrated in FIG. 12, the slot 13 penetrates through the housing.

Figure 14:
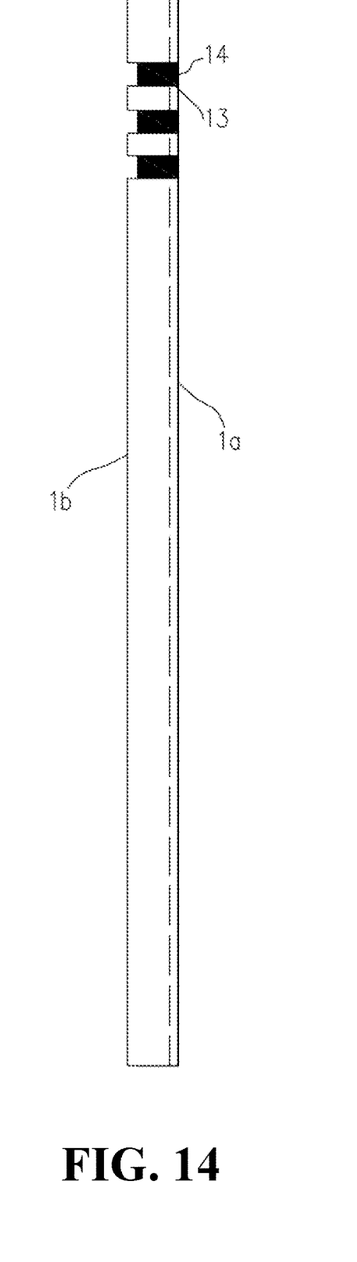
FIG. 14 is a schematic diagram of a housing having a decreased thickness.
Figure 15:
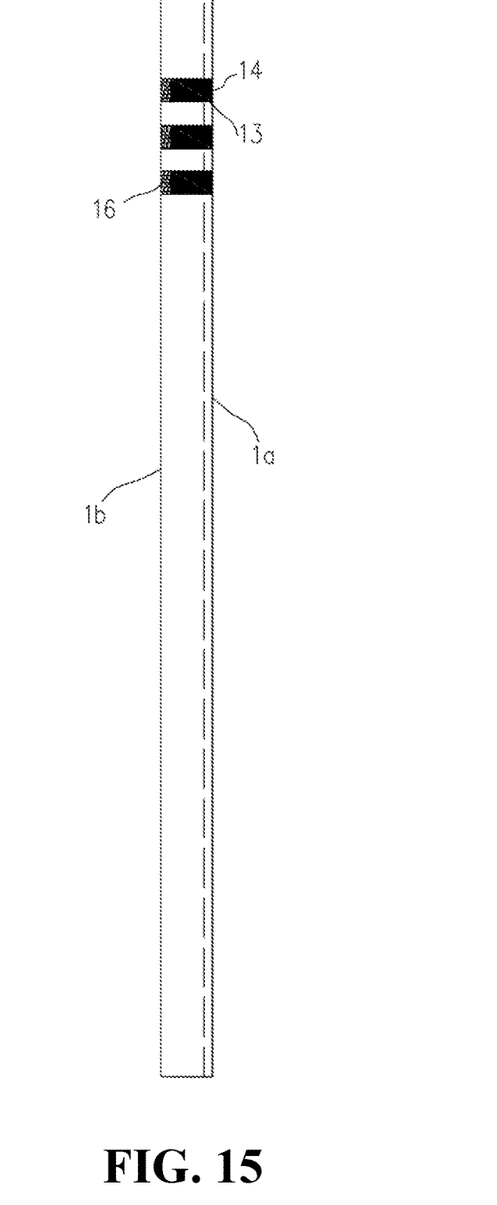
FIG. 15 is a schematic diagram of the housing having a slot filled with second non-shielding material.

In another implementation, only a portion of the outer surface 1b opposite to the at least one slot 13 may be cut, and a cutting depth is no less than the predetermined thickness. At this time, the housing 1 is as illustrated in FIG. 14. Furthermore, in order to ensure the flatness of the outer surface 1b, as illustrated in FIG. 15, the at least one slot 13 may be further filled with non-shielding material 16 from the outer surface 1b side. The non-shielding material 16 is adjacent to the non-shielding material 14 in the thickness direction of the housing, and may be the same as the non-shielding material 14.

It will be appreciated that the number of the slots 13 is not limited, and may be one or more. In the implementation, the number of the slots 13 is three, and the three slots 13 are arranged along the longitudinal direction of the housing, and the distances between two adjacent slots 13 are the same, i.e., the three slots 13 are arranged in the housing with uniform gaps therebetween.

In one implementation, as illustrated in FIG. 9, the at least one slot 13 extends from one side wall 11 to another opposite side wall 11 via the back plate 12. It will be appreciated that a portion of the slot 13 which is located in the side wall 11 extends from the connection position between the side wall 11 and the back plate 12.

Figure 13:
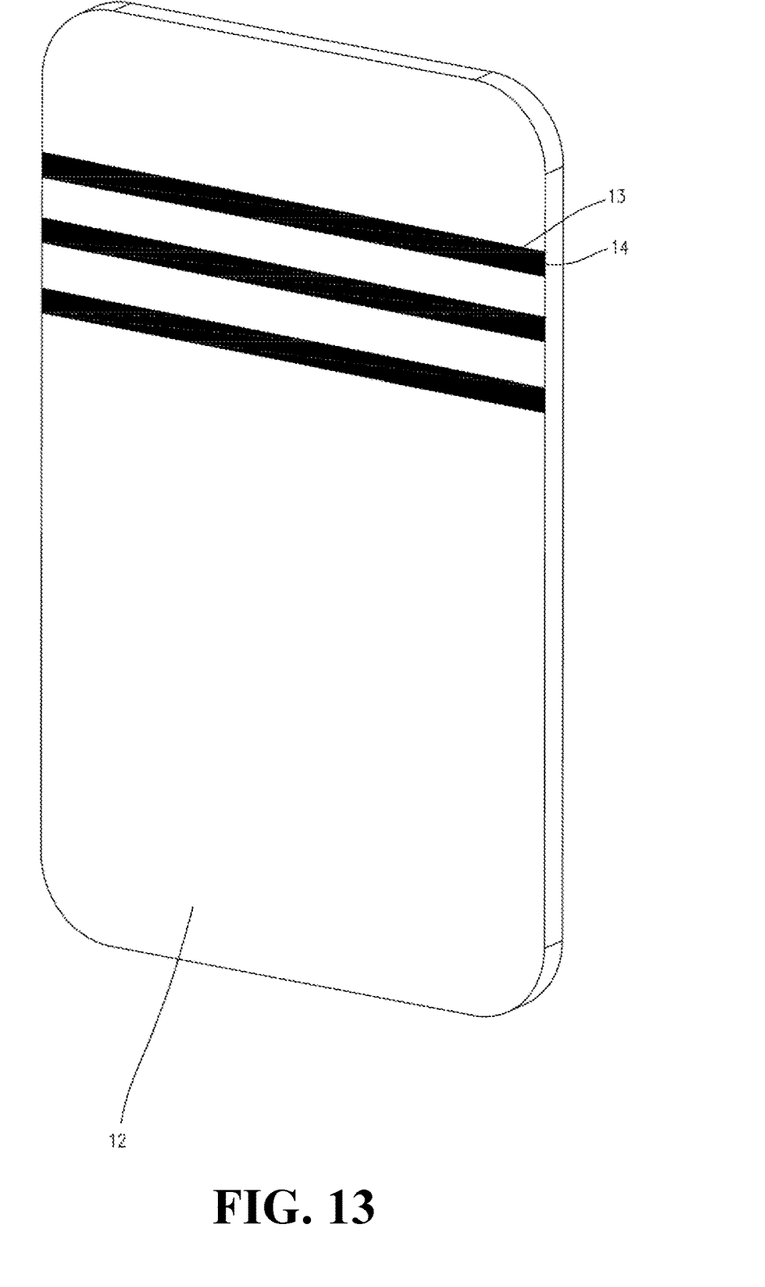
FIG. 13 is a schematic diagram of another mobile terminal according to an implementation of the present disclosure.

In another implementation, referring to FIG. 13, the at least one slot 13 extends from one side of the back plate 12 to the other side of the back plate 12.

The housing 1 as well as the mobile terminal 100 can have the slot 13 not readily deformed, by means of the method for manufacturing the housing 1 according to the present disclosure, thereby ensuring the appearance unity of the housing 1.

The foregoing is the implementations of the present disclosure. It should be noted that, several improvements and modifications can be made by persons skilled in the art without departing from the principles of the present disclosure, and these improvements and modifications also fall within the protection scope of the present disclosure.

What is claimed is:

1. A housing, wherein the housing is made of shielding material, the housing defines at least one antenna slot, the housing comprises a back plate and two side walls, the two side walls are respectively connected to two opposite sides of the back plate; each antenna slot is formed at a time by using a T-shaped cutter to along a predetermined route of an inner surface of the housing to remove material with a first predetermined thickness of the housing in a non-penetrating manner, a direction of the predetermined route sequentially extends from one side wall to the back plate and up to the other side wall; the at least one antenna slot is penetrated through the housing by removing material with a second predetermined thickness of a portion of an outer surface of the housing, corresponding to the at least one antenna slot, and the portion corresponding to the at least one antenna slot is filled with a non-shielding material, wherein the portion corresponding to the at least one antenna slot is filled with the non-shielding material is achieved by: executing a T-process to each antenna slot, and filling the at least one antenna slot subjected the T-process by injecting nano-plastic, wherein the at least one antenna slots have a width tolerance ranged from −0.3 mm to 0.3 mm, wherein a number of the at least one antenna slot is three, three antenna slots are arranged along a longitudinal side of the housing at intervals, and distances between two adjacent slots are the same.

2. The housing of claim 1, wherein the at least one antenna slot is sequentially extended from one side wall to the back plate and up to the other side wall.

3. The housing of claim 1, wherein the at least one antenna slot extends from one side of the back plate to the other side of the back plate.

4. The housing of claim 1, wherein the housing is made of aluminum.

5. A mobile terminal, comprising a housing, wherein the housing is made of shielding material, the housing defines at least one antenna slot, the housing comprises a back plate and two side walls, the two side walls are respectively connected to two opposite sides of the back plate; each antenna slot is formed at a time by using a T-shaped cutter to along a predetermined route to remove material with a first predetermined thickness of an inner surface of the housing in a non-penetrating manner, a direction of the predetermined route is sequentially extended from one side wall to the back plate and up to the other side wall; the at least one antenna slot is penetrated through the housing by removing material with a second predetermined thickness of a portion of an outer surface of the housing, corresponding to the at least one antenna slot, and the portion corresponding to the at least one antenna slot is filled with a non-shielding material, wherein the portion corresponding to the at least one antenna slot is filled with the non-shielding material is achieved by: executing a T-process to each antenna slot, and filling the at least one antenna slot subjected the T-process by injecting nano-plastic, wherein the at least one antenna slots have a width tolerance ranged from −0.3 mm to 0.3 mm, wherein a number of the at least one antenna slot is three, three antenna slots are arranged along a longitudinal side of the housing at intervals, and distances between two adjacent slots are the same.

6. The mobile terminal of claim 5, wherein the at least one antenna slot is sequentially extended from one side wall to the back plate and up to the other side wall.

7. The mobile terminal of claim 5, wherein the at least one antenna slot extends from one side of the back plate to the other side of the back plate.

8. The mobile terminal of claim 5, wherein the housing is made of aluminum.

* * * * *